US006430667B1

(12) United States Patent
Loen

(10) Patent No.: US 6,430,667 B1
(45) Date of Patent: Aug. 6, 2002

(54) SINGLE-LEVEL STORE COMPUTER INCORPORATING PROCESS-LOCAL ADDRESS TRANSLATION DATA STRUCTURES

(75) Inventor: Larry Wayne Loen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,949

(22) Filed: Apr. 13, 2000

(51) Int. Cl.$^7$ .............................................. G06F 12/10
(52) U.S. Cl. ...................... 711/202; 711/203; 711/206; 711/207; 711/153
(58) Field of Search ................................ 711/202, 203, 711/206, 207, 209, 153, 173

(56) References Cited

U.S. PATENT DOCUMENTS

| | | | | |
|---|---|---|---|---|
| 4,680,700 A | * | 7/1987 | Hester et al. | 711/206 |
| 5,590,326 A | * | 12/1996 | Manabe | 711/150 |
| 5,761,696 A | * | 6/1998 | Giordano et al. | 711/6 |
| 6,038,565 A | * | 3/2000 | Nock | 707/101 |
| 6,049,667 A | * | 4/2000 | Bates | 395/705 |
| 6,266,707 B1 | * | 7/2001 | Boden et al. | 709/245 |

OTHER PUBLICATIONS

Soltis, Frank, *Inside the AS/400*, 2nd Ed., Duke Press, Loveland, CO, (1997), Chapter 8, pp. 179–224.
May, Cathy et al., eds., *The PowerPC™ Architecture: A Specification for A New Family of RISC Processors*, Morgan, Kaufman Publishers, Inc., San Francisco, CA, (1993), Book II, Chapter 4, pp. 391–452.

\* cited by examiner

*Primary Examiner*—B. James Peikari
(74) *Attorney, Agent, or Firm*—Wood, Herron & Evans, LLP

(57) ABSTRACT

An apparatus, program product, and method perform address translation on a process-local, rather than system-wide, basis in a single-level store virtual memory management system using a plurality of process-local address translation data structures that are individually associated with particular software processes executing on a computer. By performing address translation on a process-by-process basis, many of the security concerns associated with system-wide address translation, e.g., attempting to access a virtual address for memory that has not been allocated for the associated process, are significantly reduced from the standpoint of accessing an address translation data structure, since it can be presumed that all of the information in a process-local address translation data structure was previously authorized for the process when added to the data structure. Relatively simpler and faster security checks can then be performed in association with accessing a process-local address translation data structure to minimize the processing delays associated with such accesses. In addition, with such a configuration, any additional security issues can be handled in additional fault handling processing that is executed less frequently than accesses to address translation data structures, such that such additional security processing has a reduced impact on system performance.

21 Claims, 4 Drawing Sheets

SINGLE-LEVEL STORE COMPUTER INCORPORATING PROCESS-LOCAL ADDRESS TRANSLATION DATA STRUCTURES

FIELD OF THE INVENTION

The invention is generally related to computers and computer memory management. More specifically, the invention is generally related to virtual address translation in a single-level store computer.

BACKGROUND OF THE INVENTION

Memory management, i.e., the operations that occur in managing the data stored in a computer, is often a key factor in overall system performance for a computer, particularly in the case of multi-user computers such as servers, midrange computers, mainframe computers, etc., that are accessible by multiple users. Among other tasks, memory management oversees the retrieval and storage of data on a computer, as well as manages certain security tasks for a computer by imposing restrictions on what users and computer programs are permitted to access.

A number of multi-user computers, as well as other computers in general, rely on a memory management technique known as virtual memory management to increase performance and provide greater upgradability of computers and the underlying architectural designs upon which they are premised.

With a virtual memory system, the underlying hardware implementing the memory system of a computer is effectively hidden from the software of the computer. A relatively large virtual memory space, e.g., 64-bits or more in width, is defined for such a computer, with computer programs that execute on the computer accessing the memory system using virtual addresses pointing to locations in the virtual memory space. The physical memory devices in the computer, however, are accessed via "real" addresses that map directly into specific memory locations in the physical memory devices. Hardware and/or software in the computer are provided to perform "address translation" to map the real memory addresses of the physical memory to virtual addresses in the virtual memory space. As such, whenever a computer program on a computer attempts to access memory using a virtual address, the computer automatically translates the virtual address into a corresponding real address so that the access can be made to the appropriate location in the appropriate physical device mapped to the virtual address.

One feature of virtual addressing it that is not necessary for a computer to include storage for the entire virtual memory space in the physical memory devices in the computer's main memory. Instead, lower levels of storage, such as disk drives and other mass storage devices, may be used as supplemental storage, with memory addresses grouped into "pages" (e.g., with each page representing 4096 addresses) that are swapped between the main memory and supplemental storage as needed. Another feature of virtual addressing is that security rules may often be enforced to limit the ability for a computer program to obtain data from unauthorized memory addresses.

Further, some computers, such as the AS/400 midrange computer from International Business Machines Corporation, extend the virtual memory concept by utilizing a single-level store memory management system. Unlike other memory management systems that utilize user-accessible file management systems to directly access data stored on disk drives and other mass storage devices, a single-level store memory management system essentially incorporates all potential sources of memory storage (e.g., main storage, disk drives and other mass storage devices) into the same level of memory. An object (e.g., data, program code or both), once created in a single-level store system, is accessed using a single virtual address, regardless of where the object actually resides. Moreover, any user that requests access to the object receives the same virtual address and accesses the copy of the object. Low level memory management functions handle swapping the object into and out of main storage on an as-needed basis to ensure that the object is in main storage while it is currently in use.

Due to the frequency of access requests in a computer, address translation can have a significant impact on overall system performance. As such, it is desirable to minimize the processing overhead associated with the critical timing path within which address translation is performed.

Address translation in a virtual memory system typically incorporates accessing data structures known as address translation tables that include multiple entries that map virtual addresses to real addresses on a page-by-page basis. Often, due to the large number of memory accesses that constantly occur in a computer, the number of entries required to map all of the virtual addresses in use by a computer can be significant, and require the entries to be stored in main storage, rather than in dedicated memory. To accelerate address translation with such a scheme, a form of cache, known as a translation lookaside buffer (TLB), is typically provided in hardware to cache recently-used entries for quick access by the computer. Ensuring that entries not found in the TLB are loaded quickly into the TLB is therefore critical to the performance of a computer.

In many computers such as the AS/400 computer, loading entries from main storage into the TLB is performed by the actual hardware as part of the virtual address translation. In other computers, software may be used to handle the transfer of entries into the TLB. With a software-based translation mechanism, a short sequence of instructions is executed in a special interrupt handler to supply the missing hardware function, which is usually a simple sequence of comparisons of equality between the virtual address of interest and a limited set of table entries. If no match is found, a page fault-style exception is typically generated to indicate that the TLB cannot be immediately reloaded.

Even with a completely hardware-based translation mechanism, some software may be utilized in address translation. In an AS/400 computer, for example, the hardware-accessible address translation table does not describe the entire contents of main storage. A miss on a TLB results in a hardware-based search of the address translation table in main storage. If found, the appropriate entry is reloaded into the TLB from main storage, and instruction execution resumes without an exception. If not found, however, the hardware generates what it considers to be a "page fault." Exception handling software is then called in response to the page fault to access additional data structures to determine if the page is actually resident in the main storage. If the page is found in main storage, the hardware-accessible address translation table is updated to swap out an existing entry with a new entry for the currently desired page, and execution continues without an actual page fault, where the page must be swapped into main storage. If the page is not in main storage, a conventional page fault is performed.

In a single-level store computer such as the AS/400 computer, address translation is performed machine-wide.

As a result, any job, process, task, etc. that presents a given virtual address will access the same address translation entry, and thus have access to the actual storage mapped to that entry.

One potential security concern presented by a virtual memory system is that of malicious or buggy software simply making up an arbitrary string of binary digits, loading it into a register, and trying to use it as a virtual address. In particular, consider a completely hardware-based virtual address translation mechanism but with no specific security checks, done in hardware. In such a case, the default situation is that a virtual address is authorized if it can be loaded into a register.

To address this potential security risk, computers such as the AS/400 computer utilize a number of security mechanisms that are predominantly implemented outside of the critical path of address translation to minimize adverse performance impact. First, computer programs that execute in non-supervisory states are required to use tagged pointers having a special hardware tag bit. The state of the tag bit is kept in the storage hardware and is not directly visible to programs, and ordinary stores to a given location automatically turn off the special bit. If such programs try to make up a pointer by overlaying a place where a tagged pointer was previously built, the special tag will be off and the usage will fail.

Second, trusted program translation is performed for all new computer programs prior to their being installed via a supervisor-defined software machine interface (MI). In particular, the programs are defined using MI instructions that are not capable of being directly executed on the computer, and when the programs are installed, a translator executing in a supervisor mode translates the program instructions into the actual machine instructions appropriate for execution by the computer. Since the translator is part of the supervisor of the operating system, the translator is assumed to generate instructions that correctly manipulate the special tagged pointers. The hardware-based tag mechanism also can reinforce this protection by allowing the trusted code generation to detect if a tagged region of storage was tampered with deliberately or by accident.

Third, much of the data accessible by non-supervisory programs is encapsulated in the form of "MI objects" that incorporate special pointer-controlled authorization. Each MI object has a public authority as well as additional authorities granted to individual users and classes of users. The MI Instruction set contains manipulations for these various MI Objects. The MI Instructions associated with the various MI Objects request that any existing special tagged pointers interact with this authority mechanism before creating any new special pointers. Some or all of this interaction requires the trusted translation in order to ensure that the security mechanisms cannot be bypassed. In addition, only a subset of the possible types of MI objects are capable of being directly accessed by non-supervisory programs. Special pointers are divided into various classes that the MI Instructions and the trusted translator can distinguish as needed, to permit only certain pointers to actually load or store storage within particular types of MI objects.

Fourth, higher level security mechanisms are utilized to limit the types of activities that can be performed by different modes or states, e.g., supervisor states and non-supervisory states such as user and system states. Operations performed within non-supervisory states are typically subjected to greater scrutiny than operations performed within a supervisor state, and transitions in a program from a non-supervisory state to a supervisor state are also closely scrutinized.

Restricting non-supervisory accesses to memory to using only tagged pointers, however, can be limiting in some applications. For example, it may be desirable to emulate the functionality of a "process local storage" model such as the UNIX operating system where local data can be requested by and allocated to a particular user for use solely by that user, and with authentication performed during the allocation process to meet security requirements. In such environments, it may be permissible for a non-supervisory program for that user to access the allocated data using untagged pointers, which offer lesser processing overhead and greater conformance to industry programming models, such as treating some particular storage location as both a pointer to a control block or a simple integer. It also permits a greater variety of applications, some of which have integral code generation of their own as part of their design and are technically unwilling or unable to have a supervisor-based routine generate the code.

However, given that both hardware-based and software-based address translation in a single-level store computer rely on a system-wide address translation table, the address space mapped via the address translation table spans the entire virtual address space. As such, without additional security checks performed during the address translation, there would still be the potential for a non-supervisory program executing in a process local storage model to generate an untagged pointer that attempted to access data outside of the allocated local storage. As a consequence, implementing untagged pointers on single-level store computers that use conventional address translation mechanisms would introduce unacceptable security risks, or in the alternative, would lower performance due to the requirement to perform additional security checking to address such risks within the critical timing path during which address translation is performed.

SUMMARY OF THE INVENTION

The invention addresses these and other problems associated with the prior art by providing an apparatus, program product, and method in which address translation is performed process-local, rather than system-wide, in a single-level store virtual memory management system using a plurality of process-local address translation data structures that are individually associated with particular software processes executing on a computer. By performing address translation on a process-by-process basis, many of the security concerns associated with system-wide address translation, e.g., attempting to access a virtual address for memory that has not been allocated for the associated process, are significantly reduced from the standpoint of accessing an address translation data structure, since it can be presumed that all of the information in a process-local address translation data structure was previously authorized for the process when added to the data structure. Relatively simpler and faster security checks can then be performed in association with accessing a process-local address translation data structure to minimize the processing delays associated with such accesses. In addition, with such a configuration, any additional security issues can be handled in additional fault handling processing that is executed less frequently than accesses to address translation data structures, such that such additional security processing has a reduced impact on system performance.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter implement process-local address translation data structures in a single-level store virtual memory management system. Each process-local address translation data structure is associated with a particular software process, and by performing conventional authority checking during creation of a software process and allocation of memory for the process, many of the security risks associated with performing address translation on behalf of a created software process are significantly reduced. Further, much of the security functionality is moved outside of the more critical timing paths for address translation, thereby minimizing the adverse impact of such security functionality in the overall performance of a computer.

Figure 1:
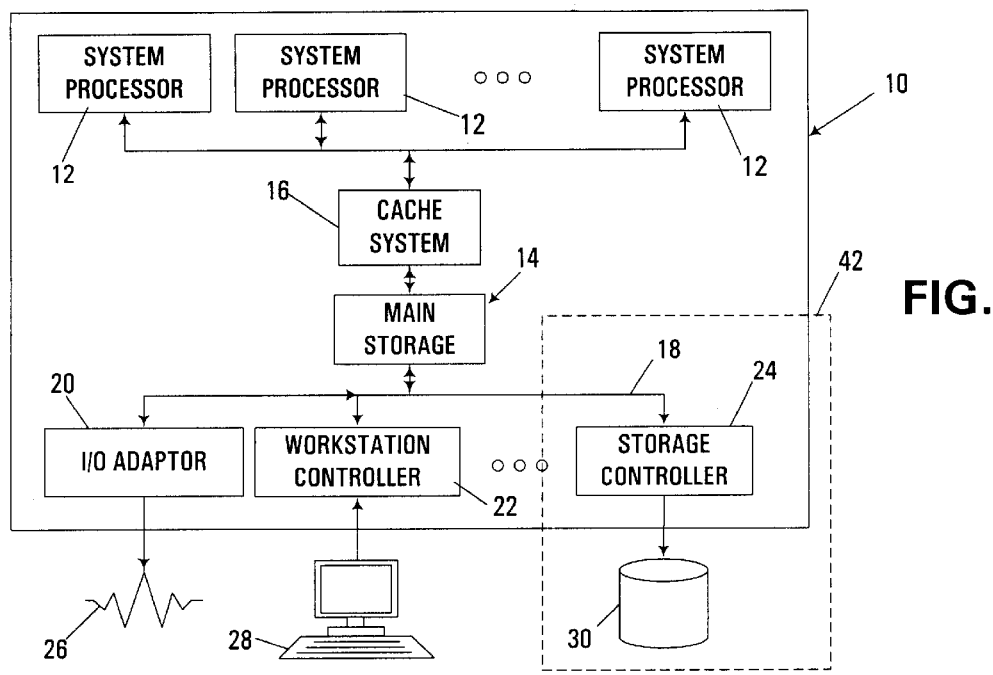
FIG. 1 is a block diagram of a single-level store computer incorporating process-local address translation consistent with the invention.

Turning to the Drawings, wherein like numbers denote like parts throughout the several views, FIG. 1 illustrates the general configuration of an exemplary single-level store computer 10 suitable for implementing process-local address translation consistent with the invention. System 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Computer 10 generally includes one or more system processors 12 coupled to a main storage through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks 26, one or more workstations 28, and/or one or more storage devices such as a direct access storage device (DASD) 30. One or more of devices 26–30 may be incorporated into, or connect to, memory storage that forms auxiliary storage used to supplement the main storage in the single-level store memory model for computer 10.

Figure 2:
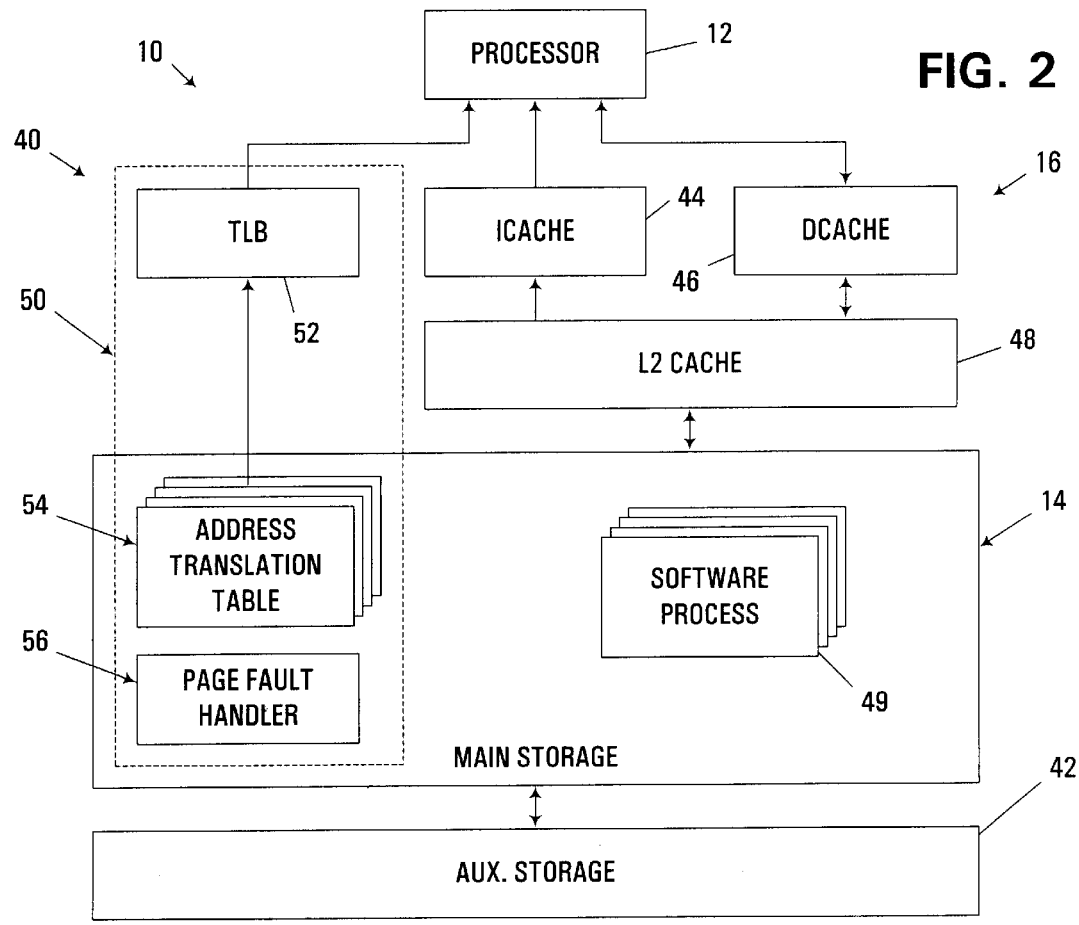
FIG. 2 is a block diagram of the primary components in a single-level store virtual memory management system implemented in the computer of FIG. 1.

FIG. 2 next illustrates the primary functional components in a single-level store virtual memory management system 40 implemented in computer 10 to manage the transfer of data between the processing complex of computer 10 (represented by processor 12) and the physical memory for computer 10, represented by main storage 14 (e.g., an array of solid state random access memory (RAM)), auxiliary storage 42 (e.g., including controller 24 and DASD 30), and cache system 16 (e.g., a level one cache incorporating an instruction cache 44 and a data cache 46, and a level two cache 48).

One component of memory management system 40 involves the transfer of data and instructions between the various physical storage devices in main storage 14, auxiliary storage 42 and cache system 16 to ensure that data and instructions requested by processor 12 are maintained as close as possible to the processor to minimize access delays in the computer. Such functionality is well known in the art and thus will not be discussed in further detail herein.

Another component of memory management system 40, however, involves the translation of memory access requests from an addressing format used by processor 12 to that used by the physical memory of the computer. Specifically, virtual addressing is utilized by various software processes 49 executed by processor 12, thus defining a virtual address space that, in a single-level store environment, is shared by all software processes. The physical memory, however, is addressed using real addresses defined within a real address space.

A software process as used herein may incorporate any number of different terms used in the art to signify a logical software construct having one or more execution paths or threads as well as allocated storage accessible by such paths, including terms such as jobs, tasks, processes, etc. In this context, each software process has specific storage (i.e., one or more ranges of virtual addresses) that has been allocated to that process, and for which address translation is required. Note that a construct typically referred to as a "thread" complicates this picture, but has surprisingly little effect on the operation of the illustrated implementation. A thread is typically one or more independent units of work, each with its own execution context, and each collectively making up the previously described process. However, since the component threads all share a common definition of authority, and are intended to share a common storage, they can each share a definition of address translation that is scoped to the process, with each merely keeping track of its own mode of execution. This is universally done in both single level store and non-single level store systems. Thus, without loss of generality embodiments of the invention can treat processes as having a single thread of execution, or multiple such threads as the case may be, since the appeal for authority to use a virtual address will be identical whether one or several threads are initiated under a given process. All that is required is that the thread have some sort of "back pointer" to its process, or key structures of the process, and that its current mode of execution (supervisor, system, or user) be independently tracked as per many conventional designs.

Such address translation is performed by an address translation mechanism 50, which translates addresses defined in the virtual address space (known as "effective addresses" in the AS/400 environment) into addresses defined in the real address space (known as "real addresses"). The addresses are typically provided to mechanism 50 via memory access requests issued by processor 12 in a manner known in the art.

Address translation mechanism 50 includes one or more translation lookaside buffers (TLB's) 52 implemented in hardware, as well as a plurality of process-local address translation tables 54 resident in main storage 14 that respectively store address translation information for each of the plurality of software processes 49. A software-implemented page fault handler 56, functioning as TLB miss handling logic, controls reloading of TLB 52 with information from the appropriate table 54 in response to a TLB miss, as well as additional security functionality that will become more apparent below. Page fault handler 56 ultimately, in response to determining that a requested page is not resident in main storage 14, initiates a page fault, incorporating conventional page swapping between main storage 14 and auxiliary storage 42, in a manner well known in the art.

In general, the routines executed to implement the embodiments of the invention, whether implemented as part of an operating system or a specific application, component, program, object, module or sequence of instructions, will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will also be appreciated that any of the functionality described herein may alternately be implemented wholly or in part within hardware or software. For example, all or part of the functionality of page fault handler 56 may be implemented in hard wired logic in some embodiments, with any remaining functionality implemented in software-based logic.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The discussion hereinafter will focus on one implementation of the invention based upon the architecture of the AS/400 midrange computer available from International Business Machines Corporation (specifically the RISC AS/400 architecture based in part on the PowerPC operating environment), and may refer to modifications or optimizations to the existing known architecture of the AS/400 computer. For example, in an AS/400 environment, address translation is performed on a page-by-page basis, with both the virtual and real memory spaces partitioned into 4096 byte pages. Moreover, address translation data structures are implemented as tables known as Hashed Page Tables (HTAB's) incorporating multiple Page Table Entries (PTE's) grouped into eight entry hash buckets, or Page Table Entry Groups (PTEG's). However, it will be appreciated by those of ordinary skill in the art having the benefit of the instant disclosure that the invention may be implemented in other single-level store environments consistent with the invention, and thus the invention should not be limited solely to an AS/400 environment or the particular nomenclature used herein.

Among various other benefits of the invention, in a single-level store computer such as the AS/400 computer, a number of unique benefits may be provided, and will become more apparent from the discussion below. For example, trusted translation and/or tagged pointers may not be required in some implementations. Even if trusted translation is still performed, for example, a different mechanism will still successfully reject unauthorized attempts to access storage, but will do so in a manner that allows non-supervisory programs (e.g., written in the PowerPC problem state instruction set) to be directly generated by known compilers, e.g., for environments such as Java, Smalltalk JIT, and UNIX, among others. Also, because of the nature of lifting the restriction, the additional instructions used to do special pointer checking and manipulation may be omitted, leading to parity with other architectures in code generation since conventional code generation can be used. Further, the requirement for different classes of pointers may be omitted, so that special pointers that were previously restricted from use for computation purposes may instead become ordinary opaque tokens, which are always checked for proper authority on each use.

In a conventional AS/400 single-store environment, a single system-wide address translation table (HTAB) is used to store address translation information that describes at least a portion of the addresses stored in main storage at any given time. In response to a translation miss on a TLB, hardware within the TLB searches the HTAB in main storage, typically by hashing the requested virtual address to access an eight-entry PTEG to locate a PTE in the PTEG having a virtual address matching the requested address. If a PTE is found, the needed values are reloaded via hardware into the TLB, and execution resumes without exception. If not, however, the hardware generates a page fault exception. A software routine, known as a "little" fault handler is called to catch the exception, and access additional data structures to attempt to locate the appropriate PTE. If a PTE is found in the additional data structures, a PTE in the HTAB is updated with the found PTE information, and execution resumes without a full page fault (hence the name "little" fault). If not, however, the requested virtual address is not in main storage, and a conventional page fault is signaled and handled via conventional mechanisms (page swapping).

In the embodiment discussed hereinafter, the aforementioned architecture may be modified in the following manner to implement process-local address translation:

1. The system-wide HTAB is replaced with multiple process-local HTAB's.
2. The hardware-based TLB reload logic is replaced by a software-based "tiny" fault handler that performs some very simple authorization checks before loading from the appropriate process-local HTAB.

3. If an appropriate HTAB entry is not found, conventional authorization mechanisms are used, with the "mode" of the process, to decide whether to finish the page fault and reload the TLB or whether to convert the page fault into an authorization exception. For instance, segments belonging to MI Objects that are not space objects may be rejected if the current execution mode is not supervisor state.

In addition, to fully implement process-local address translation, some additional modifications may be desirable:

1. At least a portion, if not the entire, TLB should be purged in response to a mode switch (e.g., supervisor to non-supervisor).
2. Task (or process) switch is treated in a similar manner to a mode switch; at least a portion of the TLB should be purged.
3. Some of the authorization mechanisms, such as the User Profile MI Object, may implement fast-path lookaside facilities to make authorization checks go faster, at least for the case of "this process already checked for a given authority and found it". Such lookaside facilities may be desirable because such checks may occur more often than they do in a system-wide translation architecture (i.e., such checks may occur as a percentage of "tiny" faults instead of a per-constructed pointer cost). In addition, the overhead for an HTAB entry "miss" may also be critical, even if infrequent, due to the relatively large path for an authorization check.

Figure 3:
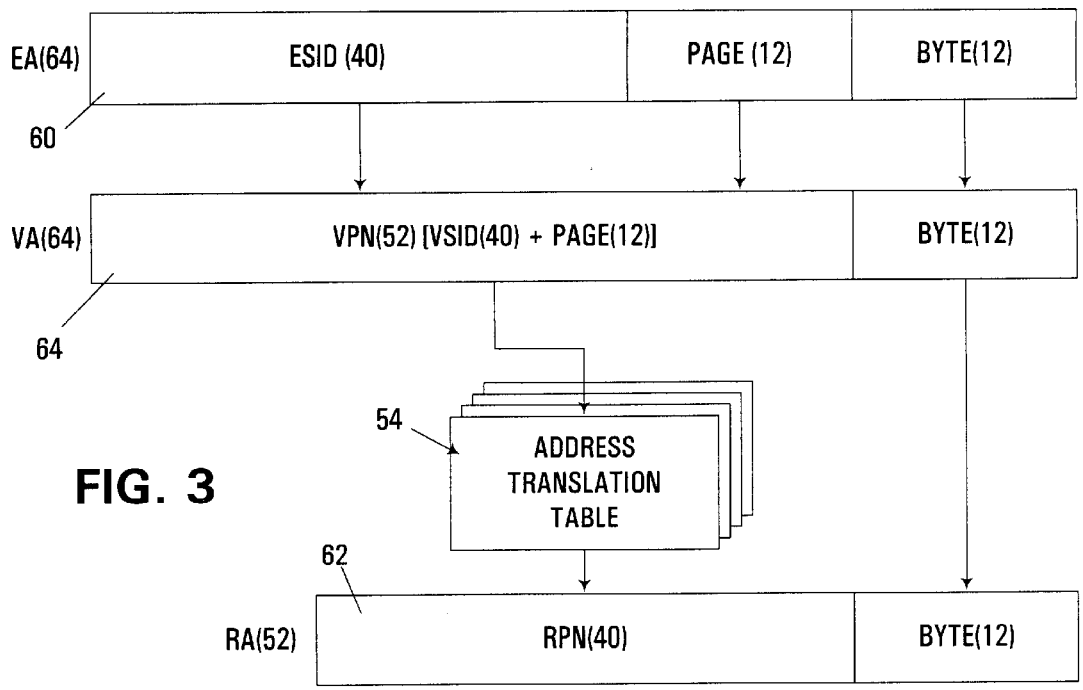
FIG. 3 is a dataflow diagram illustrating the translation of an effective address into a real address by the virtual memory management system of FIG. 2.

As shown in FIG. 3, process-local address translation may be performed to translate an effective address (EA) 60 provided in a memory access request into a real address (RA) 62, first by converting the effective address into a virtual address (VA) 64. It will be appreciated by one skilled in the art that effective and virtual addresses may be separately managed in a PowerPC operating environment that utilizes memory segmenting, e.g., for use in inherently process-local environments such as UNIX. In the AS/400 environment, memory segmenting typically is not utilized, so effective addresses and virtual addresses are essentially equivalent, as noted in FIG. 3. For both the effective address and virtual address, the lower 12 bits of a 64-bit address is allocated for specifying a byte within a page. For the effective address, the upper 52 bits are allocated to an effective segment identifier (ESID) of 40 bits and a page identifier of 12 bits. For a virtual address, the upper 52 bits form a virtual page number (VPN), which in the AS/400 environment, incorporates both the ESID and page identifier from the effective address.

To perform translation to a real address, the upper 52 bits from the virtual address are used to access the appropriate process-local address translation table 54, typically using a hashing function similar to that used in a system-wide HTAB. From that function, a PTE is retrieved including a 40 bit real page number (RPN) that is mapped to the VPN of the virtual address. The lower 12 bits forming the byte selector for the virtual address is used to provide the same offset in the real address.

Figure 4:
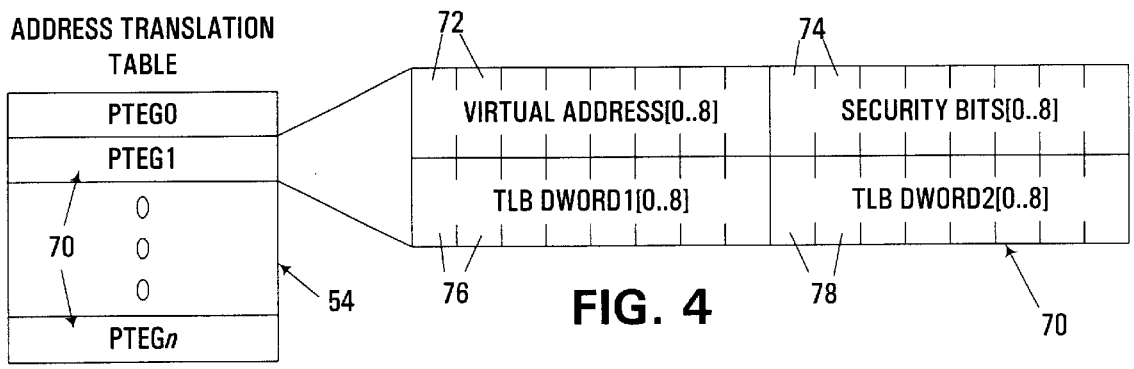
FIG. 4 is a block diagram of an exemplary implementation of one of the address translation tables in the virtual memory management system of FIG. 2.

Next, as shown in FIG. 4, one suitable implementation of a process-local address translation table 54 is illustrated, including a plurality of page table entry groups (PTEG's) 70 that are accessed by a hashing function on the VPN of the virtual address, which provides an offset to the appropriate group from the start of table 54. While any number of hashing functions may be used consistent with the invention, it may be desirable to simply use that used for conventional system-wide HTAB's.

There are a variety of ways the addresses of the tables in the illustrated embodiment can be accessed. The PowerPC architecture, for example, contains definitions of various "special purpose registers" which are defined to hold entities of this type. For instance, the address of the HTAB may be in SDR1. There are also three "spare" special purpose registers for general programming use. One of these registers may hold a pointer to storage representing the current thread of execution, the current process the thread is executing under, or both. The HTAB would be part of the process storage, e.g., replicated in the thread structure for convenient access. In fact, the code in Table II below shows yet another scheme; the HTAB of the current thread's process is replicated in the small register save area for convenient access in "real" mode there. Setting this value would have to be part of the thread switch process. Thus, by well known means, it is possible to ensure an HTAB exists for each process; one is simply allocated as part of the process created and addressed by appropriate "anchor" pointers. They are then used wherever they are in the thread, the process, or even CPU-specific structures loaded as part of a thread switch. In the illustrated embodiment, with software TLB reload, there may not be an SDR1 provided, but as has already been shown, its presence or absence by no means inhibits the invention; the HTAB's address simply need be part of the process definition and replicated wherever convenient.

In the illustrated implementation, within each PTEG 70, the entries may be interleaved as shown in FIG. 4, whereby each entry has a 64-bit virtual address field 72, a 64-bit security field 74, and a pair of 64-bit TLB words 76, 78. As a result, instead of a conventional PTE configuration of virtual address followed by the information necessary to reload the TLB, all of the entry addresses are placed first, followed by the security information, and followed by the information necessary to reload the TLB. Doing so in this manner essentially doubles the entry size compared to conventional PTE organization, albeit with enhanced performance in the critical code path, as discussed in greater detail below.

Therefore, a row of eight PTE entries in a PTEG can be represented as in Table I below:

TABLE I

PTEG STRUCTURE typedef struct {
    int64 virtualAddress[8];
    int64 securityBits[8];
    int64 TLBDWord1[8];
    int64 TLBDWord2[8];
} PTEG The virtual address field of each entry is the key used to locate a matching entry from the PTEG. The security field stores authority information representing the mode required to access the page, stored in the highest order four bits of the entry, with the remaining 60 bits being binary zeros. The TLB words 76, 78 collectively store the actual 16-byte PTE to be copied to the TLB in response to an entry match. As such, TLB words 76, 78 may be defined with the same format used by conventional AS/400-based address translation.

Interleaving of entries within each PTEG is performed in the illustrated embodiment to simplify and accelerate searching through a PTEG, since known PowerPC ldu (load double word with update) instructions may be used to both load the virtual address field for an entry for comparison and increment a pointer to point to the virtual address field for the next entry. Further, by using suitable offsets, it is routine to access the other fields of an entry when a matching entry is found. It will be appreciated that entries may not be interleaved in other implementations. It will further be appreciated that other data structures may be used to store address translation information consistent with the invention. Moreover, alternate information may be stored for each virtual address in other embodiments.

Figure 5:
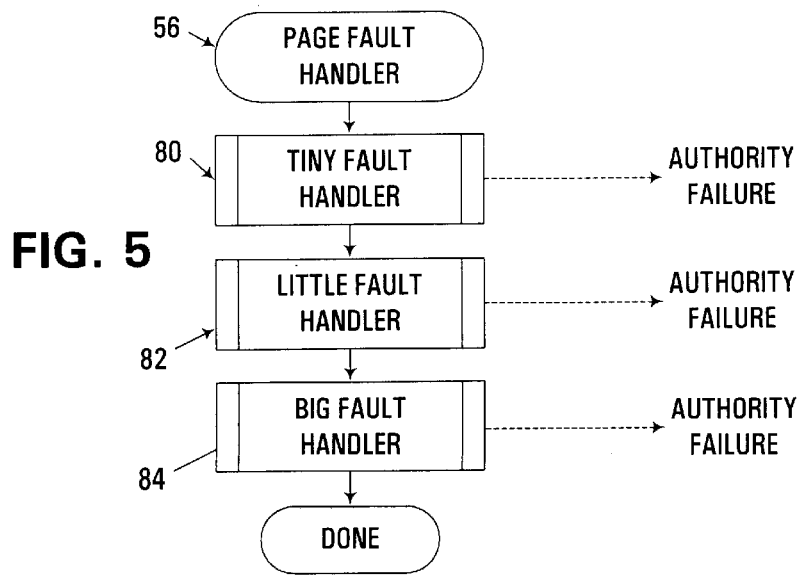
FIG. 5 is a flowchart illustrating the sequence of operations performed by the page fault handler in the virtual memory management system of FIG. 2.

Now turning to FIG. 5, page fault handler routine 56, which operates as TLB miss handling logic, is illustrated in greater detail. As discussed above, implementation of process-local address translation may incorporate moving TLB reload functionality from hardware to software, represented in this implementation by a "tiny" fault handler 80 that is called in response to a TLB miss. If the tiny fault handler cannot load the TLB with a PTE from the appropriate process-local address translation table, control is passed to a little fault handler 82, which attempts to search additional data structures in main storage for appropriate address translation information. If a PTE is still not found, a big fault handler 84 is called to perform conventional page fault processing, whereby the requested page is swapped into main storage in a manner well known in the art. Moreover, as shown in FIG. 5, some authority checking is performed in both tiny fault handler 80 and little fault handler 82, with authority problems signaling "authority failure" exceptions that are handled by the computer in an appropriate manner that will be apparent to one of ordinary skill in the art having the benefit of the instant disclosure.

Figure 6:
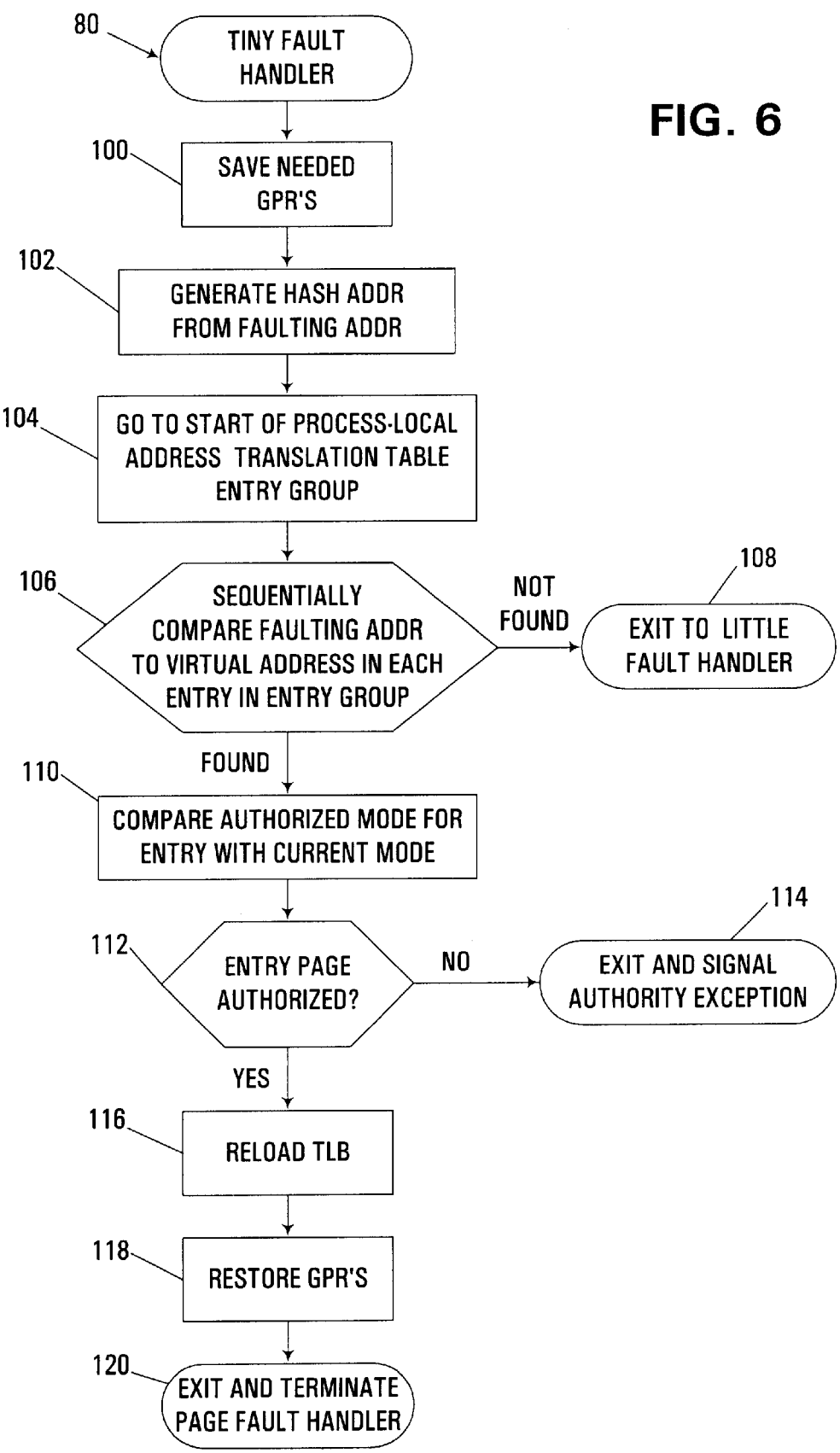
FIG. 6 is a flowchart illustrating the sequence of operations performed by the tiny fault handler referenced in FIG. 5.

FIG. 6 illustrates the basic operation of tiny fault handler routine 80 in greater detail. Routine 80 begins in block 100 by freeing up (saving) a few general purpose registers used by the routine. Next, in block 102, the hash address is obtained or created from the faulting virtual address provided to the routine. Next, in block 104, the appropriate PTEG for the process-local address translation table is found based upon the hash function. The base address of the proper process-local address translation table is located by accessing a pointer set in a common register save area by a thread/task switch procedure. In block 106, the faulting address is compared to the virtual address for each entry in the PTEG in sequence until a matching entry is found. If the compare fails after all entries are tested, control passes to block 108 to exit to the little fault handler.

If, on the other hand, one of the compares locates a matching entry, control passes to block 110 to compare the authorized mode for the entry with that of the current mode of execution. If the current mode is not authorized for the entry, an authority exception is signaled by passing control to block 114, and routine 80 terminates. If the current mode is authorized, however, control passes to block 116 to reload the TLB with the appropriate PTE information from the matching entry. Next, in block 118 the registers used by the routine are restored, whereby control then passes to block 120 to terminate routine 80 and exit the page fault handler without exception.

One suitable PowerPC instruction set program suitable for implementing the functionality of routine 80 is presented below in Table II:

TABLE II

TINY FAULT HANDLER

| | | | |
|---|---|---|---|
| 1 | intspr | R1,SPRSpare | ;saveR1 |
| 2 | mfspr | R1,SPRrealbase | ;get the base real address for this CPU |
| 3 | std | R2,SaveR2(R1) | ;save a few GPR's |
| 4 | std | R3,SaveR3(R1) | |
| 5 | std | R4,SaveR4(R1) | |
| 6 | mfspr | R2,Faulting_Addr | |
| 7 | mfspr | R3,Hash_result | ; if this is calculated in software, R4 and R3 can calc quickly |
| 8 | shiftleftlogical | R3,logSizePTEG | ; get hash value to correct PTEG boundary |
| 9 | ld | R4,HTABBase(R1) | ; current process-local HTAB, base real address |
| 10 | or | R4,R4,R3 | ; get starting address for compare |
| 11 | ld | R3,8(R4) | ; load R3 with EA of (R4) |
| 12 | cmpr | R3,R2 | |
| 13 | beq authority_check | | |
| 14 | ldu | R3.8(R4) | ; R4 incremented by 8, then load R3 with new EA of (R4) |
| 15 | cmpr | R3.R2 | |
| 16 | beq authority_check | | |
| ... (six more checks repeating 14–16, which advance R4 by 8 before the load of the new entry) ... | | | |
| 17 | branch little_fault_handler | | |
| 18 | authority_check | | ; this short, basic check allows one HTAB per local process by ensuring the current execution mode is authorized to this page |
| 19 | ld | R3.64(R4) | ; this is a parallel word 64 bytes past the successful compare address; its high order 3 bits contain a hierarchical indication of the mode. |
| 20 | ld | R2.ModeBits(R1) | ; a copy of the current mode from the task |
| 21 | compareUnsigned R2,R3 | | |
| 22 | branchGT mode_authority_problem | | ; if mode bits of storage are higher than current mode(e.g. encapsulates supervisor storage accessed by user state), generate exception |
| 23 | ld | R2,64+64(R4) | |
| 24 | ld | R3,128+64(R4) | ; load the PTE information into register pair |
| 25 | loadTLB | R2,R3 | |
| 26 | Reload_Saved_GPRS( ) | | ; a simple macro to reload R1 through R4 |
| 27 | returnFromInterrupt | | |

In the above routine, use of per-processor real storage and a few special purpose system registers (SPR's) is assumed. The routine also presumes, for path length savings and simplicity, that the hash generated by the hardware is available in an SPR called Hash_result. In the alternative, the routine may perform the hash in lieu of hardware.

It may be seen from Table II that checking each entry in a PTEG is performed iteratively, thereby taking advantage of the automatic updating of the entry pointer from the ldu instruction, and minimizing path length vs. a loop implementation. Given the frequency at which routine 80 may be executed, it is desirable to maximize performance in the routine as much as possible, although a loop implementation may also be used.

Authority checking in the routine of Table II relies on priority encoded mode authorization, whereby the higher the mode, the less likely the authorization. The security field of each entry includes four high order bits encoding the authorization for the page, e.g., as shown in Table III:

TABLE III

PAGE AUTHORITY ENCODING

| Public | Private | System | Supervisor | |
|---|---|---|---|---|
| 0 | 0 | 0 | 0 | no one authorized to page |
| 0 | 0 | 0 | 1 | supervisor only authorized |
| 0 | 0 | 1 | x | system and supervisor authorized |
| 0 | 1 | x | x | current user, system, supervisor auth. |
| 1 | x | x | x | global, everyone authorized |

The same bits are stored for the current mode of the current process, also referred to as a Task Dispatching Element (TDE), e.g., using the coding shown below in Table IV:

TABLE IV

MODE ENCODING

| Public | Private | System | Supervisor | |
|---|---|---|---|---|
| 0 | 0 | 0 | 1 | -- in supervisor state |
| 0 | 0 | 1 | 0 | -- in system state |
| 0 | 1 | 0 | 0 | -- user state |

As can be seen from Tables III and IV, the possible authorization levels are encoded with an increasing number of leading zero bits from the lowest authorization level (public) to the highest authorization level (supervisor). As will become more apparent below, such an encoding scheme may be used to efficiently determine authorization for a requested page using only a few instructions.

In particular, as shown at lines 19–22 of Table II above, authorization for a page can be performed relatively quickly and efficiently by a simple unsigned compare of the task versus the page authority bits. As the numerical value of the authority bits increases as the authorization mode decreases, if the numerical value of the authority bits for the task is greater than the numerical value of the authority bits for the page, the page is not authorized in the current mode and an exception will be thrown. If the page is authorized, it can be assumed that some earlier page fault did the more extensive MI-style authority checks and created the entry, so it is acceptable to proceed immediately to the logic to reload the TLB.

Other encoding schemes may be used in other applications. For example, it may be desirable to omit the "Public" mode in some implementations.

Implementation of the TLB loading operation (e.g., at line 25 of Table II) may be performed in a number of manners. For example, the TLB may be configured to correspond to the L1 cache(s) in terms of hashing rules and associativity. In the alternative, different hashing and associativity may be used.

Using the aforementioned HTAB entry format, the TLB loading operation incorporates, in part, simply copying the last two doublewords (in the format of a conventional TLB PTE) from the appropriate HTAB entry. Determining where to store the PTE information in the TLB may incorporate several alternatives. For example, the software may manually hash the address and decide which associativity index to use within a given hash bucket. In the alternative, the hashing results may be reused as one operand to determine a row in the table, with a software managed index used as another operand determining the table column.

As another alternative, hardware may be used to make an arbitrary choice of which element in the hash bucket to replace (e.g., based on a rolling counter), whereby the load TLB instruction may simply have the format "LoadTLB r1, r2, r3", where r1 is ignored, and r2 and r3 store the PTE information. The instruction would typically hash the ESID value in the PTE information as for an ordinary storage reference, and place it in any of the TLB entries that correspond to the hash class represented by the ESID, using any number of known algorithms.

Figure 7:
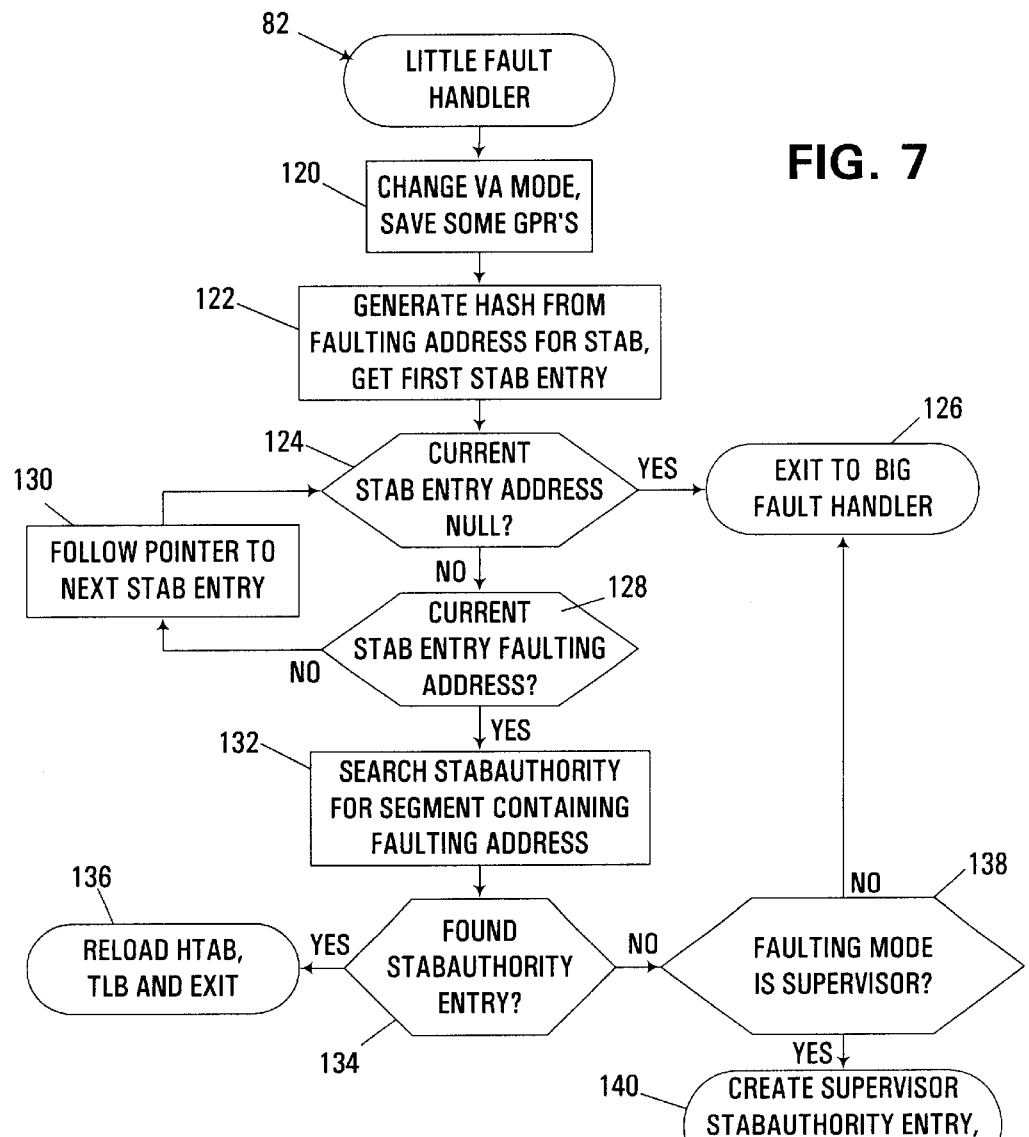
FIG. 7 is a flowchart illustrating the sequence of operations performed by the little fault handler referenced in FIG. 5.

Now turning to FIG. 7, one suitable implementation of little fault handler routine 82 is shown. Prior to a discussion of such routine, however, a brief discussion of a software-maintained address translation structure will be provided.

By its nature, the HTAB typically must be of modest size. The HTAB is a hashed-cache which may eventually contain all possible main storage pages, but does not describe the entire main storage at any given moment. The storage even in system-wide HTAB's must be modest, because such HTAB's must be accessed by hardware at high speed without suffering a TLB miss. Given that there is one HTAB per process in the illustrated implementation, the amount of available space is further limited.

The little fault handler, by contrast, is intended in the illustrated embodiment to manage a separate, software-maintained list that does include all of main storage and to use that list to reload the appropriate HTAB. In the illustrated embodiment, that enables the TLB reload operation to complete via a freshly-created PTE entry just as if such entry had been there all along.

Figure 8:
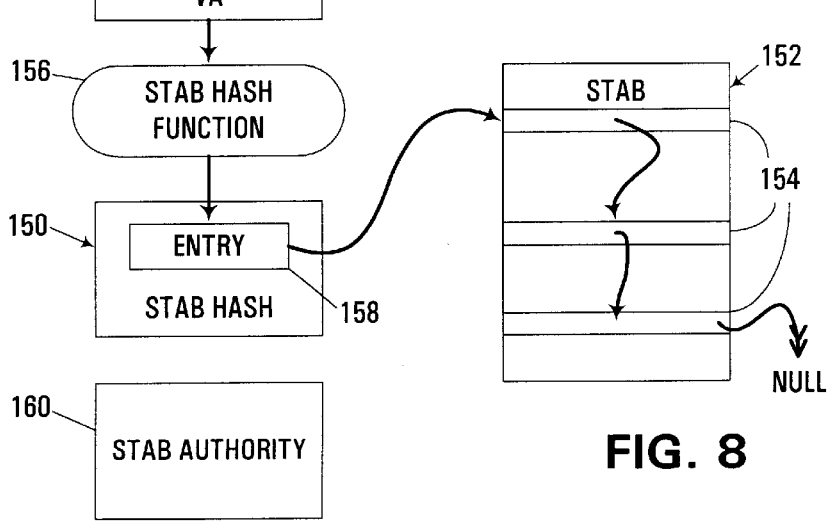
FIG. 8 is a block diagram of a software-maintained address translation data structure utilized by the little fault handler of FIG. 7.

In a conventional design, a software-maintained address translation table (referred to hereinafter as an STAB) includes information about attributes (like whether a page is a "system" or "user" state page, and items irrelevant to the illustrated embodiment, like how to transfer the page to and from the disk). It is preferentially accessed by a system-wide hash table which then points to the first of what may be an arbitrary number of entries with the same hashing value, all connected by a series of ordinary address pointers in methods well known in the art. This hash scheme need not be identical to the one used for any HTAB. As shown in FIG. 8, software-maintained address translation data structure includes structures known as an STABHash 150 and an STAB 152. There is one STABEntry 154 in the STAB 152 for each real page frame in the machine.

Little fault handling in the illustrated embodiment, calculates the hash and "runs" the chain of members of that hash class until it perceives a "match" or until it runs out of entries. If it runs out of entries without a match, the big fault handler is invoked, as an ordinary page fault has occurred.

Additional problems may accrue in the little fault handler, and also in the big fault handler, such as discovering that paging operations to or from the underlying disk are in progress and like matters that may invoke arbitrary delay. All of this is well-known in the art. Once an entry is found, and any necessary delays taken, a conventional little fault handler is free to reload some corresponding HTAB PTE page entry, picked because it was not in use or judged as less important than other current members of the PTE set that must contain the current faulting address.

In the illustrated embodiment, the same hash table may be used and the same chain of entries of the same hash class may also be run. However, some additional problems may accrue relative to authority checks in the case where a match is found.

First, the STAB and STABHash represent system-wide structures. Accordingly, the simple system of bits in the HTAB cannot be used, for authority must be scoped to the currently executing process.

Second, there are practical problems in the little fault handler. While a typical little fault handler would run with virtual addressing enabled again (recall that the tiny fault handler typically runs without virtual address translation), it also typically has limits at various places in its execution about the number and types of storage it can access, because the little fault handler must be able to handle all of its own page faults from its own resources or at least be able to readily recognize them and hand them off to the big fault handler without an infinite recursion of faults in either the little or big fault handlers. Accordingly, various implementations might partition the various authority checks in a variety of ways. Even if the page is present in the STAB, it might be prudent to enter the less restricted world of the big fault handler at any time. Since it is technically possible in conventional designs for concurrent page faults to bring an entry into existence in the STAB between the time a little fault hands off control to a big fault and the big fault completes work, there is, in general, no significant barrier to handing off from the little fault handler to the big fault Handler for authority checking whenever necessary and independent of whether the page entry is currently in the STAB or not.

Accordingly, the illustrated embodiment adds a process local structure, the STAB Authority 160, to the system. This structure contains not a page level, but a segment level, representation of objects (e.g., with the ESID as a "key") and the authority for the current process to any segment making up some object. That is, it contains the ESID of a given segment and the authority bits previously described for the HTAB entry. Since each entry represents a large number of pages, the overall table will tend to be fairly modest in size and cost and can be kept, without loss of generality, to a fixed size just as the already process local HTAB is. Note that STAB Authority entries can therefore be replaced at any time, but a key performance attribute would be doing so infrequently (though this is not as critical by any means as fast reload of the TLB is). Since entries have unique segment addresses, any suitable means in the art would be possible to organize and search this table. It may be yet another hashed search, it might even be a simple sequential search ordered by recent use, or a binary search of ESID ordered entries. A simple declaration in the C language of STAB Authority might look as in Table V below:

TABLE V

STAB AUTHORITY STRUCTURE

```
struct STABAuthority {
    int length; /*current length of structure*/
    int64 esidvalue [MAXLENGTH]; /*Only upper N bits of the ESID
        are valid, the rest are zeroes*/
    int64 securityBits[MAXLENGTH];/Contains the authority bits that
        will be copied to PTE entries of individual pages*/
};
```

One suitable algorithm for little fault Handling is shown in FIG. 7. The Little Fault handler typically switches execution mode to permit virtual addressing and saves a few GPR's (block 120). Next, the little fault handler searches the chain of STAB entries 154 (FIG. 8) using blocks 122–130. That is, the faulting address is hashed in block 122 and a current STAB Entry 154 from STABHash entry 158 in STABHAsh 150 (FIG. 8) is obtained. It will then see if the entry is null (block 124). If so, then an ordinary page fault has happened, and the big fault handler is invoked via block 126.

If not null, then the current entry is compared to see if it is the faulting virtual address at block 128. If the compare succeeds (meaning the page is present in main storage), the current STAB Authority array 160 (FIG. 8) is searched (block 132). As already mentioned, a variety of suitable conventional searches can be performed as suggested at block 132. If, at block 134, the result of block 132 says the segment corresponding to the faulting address is present, the corresponding authority bits are loaded into the selected PTE as part of an otherwise conventional reload of the PTE at block 136. The routine then concludes by reloading the TLB as per the end of the tiny fault handler, also at block 136.

If the STAB Authority entry in STAB Authority 160 is not found, a further check is made to see if the faulting thread's mode of execution is supervisor mode at block 138. If so, an STAB Authority entry is created at block 140 with the authority bits set to indicate the page is restricted to Supervisor, and execution terminates with an otherwise conventional PTE reload and current invention reload of the TLB and PTE. The check for supervisor state limits recursion.

If the current mode is not supervisor mode, and the STAB Authority entry is not found (again at block 138), the current little fault becomes a big fault (block 126). The big fault handler, on this path, when it determines that the page is again safely in the STAB and again notices that the STAB Authority is absent, will execute all necessary system authority mechanisms to determine the right values for the authority bits for the current segment and process. Conventional authority checks of the illustrated embodiment include, for example:

a. Checking in known, supervisor restricted locations in the segment(s) making up the object for public authority.

b. Various items such as the "User Profile" object associated with the current process having authority to the storage.

c. Access Control Lists as another source of authority for some object types.

d. Whether the page is the first page of a segment (always needs supervisor authority).

Once having done so, the big fault handler updates the STAB Authority entry for the current segment under the current process to contain the new authority bit values and completes the page fault by reloading the PTE and the TLB also using the new PTE authority bit values as per the ending of the little fault.

Whenever the authority exception is raised from the tiny fault handler, the execution state is restored to general execution in the supervisor. Thus, arbitrary page faults are again possible. Since what will become the PTE authority bits of the STABAuthority entry might have been artificially set to supervisor mode, the authority exception handler will repeat the logic of the big fault handler as described above, looking at all sources on conventional authority in hopes of finding that a less restrictive bit setting is possible. If this takes place, the STAB Authority entry is adjusted, the exception is not raised, and the page fault continues as a big fault.

Note that while other embodiments are possible, the described embodiment has two important properties:

1. No entry is made in the hardware page table that is not warranted by the current mode of execution.
2. No infinite recursion of authority checks is possible. In particular, virtually all sources of authority are in supervisor encapsulated storage in an AS/400 environment. By simply always setting the bits for supervisor mode for STAB Authority entries created under supervisor mode page faults, no recursion is possible.
3. Yet, if lesser authority is warranted for the page, it is discovered in the Exception handling mechanism. Since, as a statistical matter, the supervisor mode programs overwhelmingly touch supervisor pages, this side-step will not occur very often, but must be allowed for.

It should be noted that whether checked in the authority exception code or the big fault handler, it may also be desirable in some implementations to maintain extra cache storage in either the user profile or the process to enable the more expensive lookups (e.g., using the UserProfile Index) from being repeated later on with any frequency.

The mode_authority_problem code called by routine 80 will normally raise an exception. There may be cases, however, where the true state of affairs is more complicated than the simple, hierarchical check. In that case, secondary checks may be included in the mode_authority_problem program code to determine if the page is potentially authorized even though it fails the simple priority encoding check. The encoding by the little fault handler routine may simply guarantee that the simple hierarchical encoding never authorizes incorrectly and that it will, with fairly high probability, obtain the right answer.

It should also be noted that it may be desirable in some implementations to use "real" mode addressing for the tiny fault handler routine, with the little fault handler routine and mode_authority_problem program code switching to virtual addressing upon execution.

To complete this description, one notes that as long as the TLB is purged whenever there is a process switch, or when the process switches from a lesser mode of execution to a more privileged one, the TLB is always "clean" and never contains addresses not explicitly authorized for that mode because the TLB is purged.

The purge of the TLB itself can occur in a number of conventional manners. Some machines provide an instruction that invalidates the entire TLB array. In others, it might be possible to fetch and store particular entries. In a machine of the latter sort, it might even be possible to "remember" the TLB at task switch time and reload it when given control later on. Otherwise, a simpler alternative for a 64-bit address space is to load the TLB with addresses that are never considered valid, and so never result in successful access. They are, of course, rapidly replaced with valid TLB entries by tiny faults in the new execution. For hardware schemes, or schemes that replace the entire TLB, this is exactly what tends to happen in conventional machines.

The aforementioned configuration provides a number of unique benefits over conventional single-level store designs. A number of benefits and features of the aforementioned configuration are listed below:

1. While the possibility of the expensive user profile style checks is increased in the herein described configuration, the hierarchical comparison should succeed often and at very little additional overhead compared to a simple implementation of a security-free TLB handler. In the embodiment shown, only three additional instructions relate to security (in part, because of the use of the ldu instruction). As long as these represent a "high hit ratio" path, the added overhead is tolerable.
2. Even with a high hit ratio with the hierarchical check shown, regular MI authority checks may still need some streamlining. However, some entities, such as the user's PASA or PSSA type storage, should be easily determined without referencing the user profile. Caching user profile checks, again on a process-local basis, may be used to eliminate index operations in most cases.
3. Because the HTAB is now process-local, the fast path in the HTAB need not be concerned with global security issues. Since the TLB is purged and a per-process HTAB is used, the mere presence of an entry in the table means that the authorization mechanism has authorized the object to that particular job/user/mode. Entries added because of adoption of a profile like QSYS will also be system-state encoded and so should not be allowed when user mode resumes.
4. Due to the additional security protections afforded by the process-local address translation scheme described herein, trusted translation may not need to be utilized, which may provide the following additional benefits:
   a. Conventional trusted code typically uses special LoadQuad instructions, which in themselves cost more than an ordinary load and also require some custom hardware.
   b. Conventional trusted code typically must generate instructions to check to see if the first (encapsulated) page of an otherwise unencapsulated object is being referenced. With the aforementioned configuration, an access to the first page of an otherwise unencapsulated object would simply fail the authority check as any other encapsulated page.
   c. Conventional trusted code typically must defensively worry whether address arithmetic will overflow into a next virtual segment. Because all the authority happens at page fault time, the code in the aforementioned configuration can ignore this problem and expect to get exceptions. There may be a minor risk of added bugs from the inventive approach in some implementations (if the erroneous address happens to be a different, authorized location), but as address errors within the segment cannot be defended against, this risk is small and incremental compared to the performance gained. There is no security or authority problem in any case.
   d. Conventional trusted code must manipulate the tag bit (several special instructions to set or check the bit, including some "traps" if the checks fail). Tagged pointers are not required in the illustrated implementation.

e. Conventional trusted code handles 16 byte entities and must load and manipulate all 16 bytes to load an address. With the aforementioned configuration, code that handles unencapsulated storage may only have to deal with 8 bytes.

5. Some implementations of the process-local storage model described herein may also implement a thread local word that keeps track of the base process local address (e.g., the high order 20 or so bits of the 64 bit address are a fixed value and can be found matched to the faulting address in about four instructions added to the tiny fault handler shown). In this case, no authorization checks would ever be required and any address using the process-local storage could be trivially authorized and permitted. Any further authority problems would relate to the ordinary access, which would need to be enforced regardless.

6. For threaded implementations, multiple threads within the same process will often not require purging and reloading of the TLB or changing to a new process-local HTAB. In particular, if the next thread of execution happens to be in the same processor mode and the same process, then the purge or reload of the TLB can be dispensed with, as well as the change of HTAB. When this is not so, then the TLB is still purged, but the HTAB can remain the same.

Various modifications may be made to the illustrated embodiments without departing from the spirit and scope of the invention. For example, if a hierarchical security check fails, a per-mode or even per-activation group approach may be used instead to reduce path length in the software TLB handler, since no mode check would be needed. However, such an implementation would likely increase storage overhead significantly, because the number of address translation tables would need to increase from one per process to some larger number per process.

Other modifications will be apparent to one of ordinary skill in the art. Therefore, the invention lies in the claims hereinafter appended.

What is claimed is:

1. An apparatus, comprising:
   (a) a memory accessible in a first address space;
   (b) a processor coupled to the memory and configured to execute a plurality of software processes in a second address space; and
   (c) a single-level store virtual memory management system coupled to the memory to translate memory access requests issued by the processor from the second address space to the first address space, the memory management system including a plurality of process-local address translation data structures, each process-local address translation data structure associated with one of the software processes and configured to map at least one address from the second address space and used by the associated software process to a corresponding address from the first address space, wherein the single-level store virtual memory management system is configured to, in response to a memory access request issued by the processor for a first software process among the plurality of software processes, access a first process-local address translation data structure among the plurality of process-local address translation data structures that is associated with the first software process.

2. The apparatus of claim 1, wherein the first address space is a real address space, and wherein the second address space is a virtual address space.

3. The apparatus of claim 1, wherein each process-local address translation data structure includes a plurality of address translation entries, each address translation entry configured to map at least one address from the second address space to a corresponding address from the first address space, and wherein the single-level store virtual memory management system further comprises:
   (a) a translation lookaside buffer (TLB) coupled to the processor and configured to cache a plurality of address translation entries; and
   (b) TLB miss handling logic configured to, in response to a miss to the TLB occurring as a result of an attempt to use a first address in the first software process, access the first process-local hardware page table to determine whether an address translation entry for the first address is stored in the first process-local hardware page table.

4. The apparatus of claim 3, wherein the TLB miss handling logic is further configured to, in response to determining that an address translation entry for the first address is stored in the first process-local hardware page table, store the address translation entry for the first address in the TLB.

5. The apparatus of claim 4, wherein the single-level store virtual memory management system is further configured to purge the TLB in response to a process switch in the processor.

6. The apparatus of claim 4, wherein the single-level store virtual memory management system is further configured to purge the TLB in response to an authority mode switch in the processor.

7. The apparatus of claim 4, wherein the TLB miss handling logic is further configured to perform mode authorization for the first address prior to storing the address translation entry for the first address in the TLB.

8. The apparatus of claim 7, wherein the TLB miss handling logic is configured to perform mode authorization by comparing a current mode for the first process with authorization information stored in the address translation entry for the first address.

9. The apparatus of claim 8, wherein the processor is configured to compare the current mode with the authorization information by retrieving a plurality of mode bits associated with the first process, retrieving a plurality of authorization bits from the address translation entry for the first address, and comparing the mode bits to the authorization bits, wherein the mode and authorization bits each represent one of a plurality of authorization levels, with the plurality of authorization levels encoded with decreasing binary values from a lowest authorization level to a highest authorization level such that a current mode is authorized to access a virtual address if the binary value represented by the mode bits is less than or equal to the binary value represented by the authorization bits.

10. A method of managing a single-level store virtual memory system, the method comprising:
   (a) receiving a memory access request to access a memory that is accessible in a first address space from a processor that executes a plurality of software processes in a second address space, the memory access request associated with a first software process among the plurality of software processes, and the memory access request identifying a first address from the second address space; and
   (b) translating the first address from the second address space to the first address space, including accessing a first process-local address translation data structure among a plurality of process-local address translation data structures, wherein each process-local address translation data structure is associated with one of the software processes and configured to map at least one address from the second address space to the first address space, and wherein the first process-local address translation data structure is associated with the first software process.

11. The method of claim 10, wherein the first address space is a real address space, and wherein the second address space is a virtual address space.

12. The method of claim 10, wherein each process-local address translation data structure includes a plurality of address translation entries, each address translation entry configured to map at least one address from the second address space to a corresponding address from the first address space, and wherein the single-level store virtual memory management system further comprises a translation lookaside buffer (TLB) coupled to the processor and configured to cache a plurality of address translation entries, and wherein translating the first address from the second address space to the first address space further includes:

(a) accessing the TLB to determine whether an address translation entry associated with the first address is stored in the TLB; and (b) in response to a miss to the TLB occurring as a result of the access to the TLB, accessing the first process-local hardware page table to determine whether an address translation entry for the first address is stored in the first process-local hardware page table.

13. The method of claim 12, wherein translating the first address from the second address space to the first address space further includes, in response to determining that an address translation entry for the first address is stored in the first process-local hardware page table, storing the address translation entry for the first address in the TLB.

14. The method of claim 13, wherein translating the first address from the second address space to the first address space further includes purging the TLB in response to a process switch in the processor.

15. The method of claim 13, wherein translating the first address from the second address space to the first address space further includes purging the TLB in response to an authority mode switch in the processor.

16. The method of claim 13, wherein translating the first address from the second address space to the first address space further includes performing mode authorization for the first address prior to storing the address translation entry for the first address in the TLB.

17. The method of claim 16, wherein performing mode authorization includes comparing a current mode for the first process with authorization information stored in the address translation entry for the first address.

18. The method of claim 17, wherein comparing the current mode with the authorization information includes:

(a) retrieving a plurality of mode bits associated with the first process;

(b) retrieving a plurality of authorization bits from the address translation entry for the first address; and (c) comparing the mode bits to the authorization bits;

wherein the mode and authorization bits each represent one of a plurality of authorization levels, with the plurality of authorization levels encoded with decreasing binary values from a lowest authorization level to a highest authorization level such that a current mode is authorized to access a virtual address if the binary value represented by the mode bits is less than or equal to the binary value represented by the authorization bits.

19. A program product, comprising:

(a) a program implementing at least a portion of a single-level store virtual memory system used to access a memory that is accessible in a first address space by a processor that executes a plurality of software processes in a second address space, the program configured to, in response to a memory access request issued by the processor for a first software process among the plurality of software processes, access a first process-local address translation data structure among a plurality of process-local address translation data structures, wherein each process-local address translation data structure is associated with one of the software processes and configured to map at least one address from the second address space to the first address space, and wherein the first process-local address translation data structure is associated with the first software process; and (b) a signal bearing medium bearing the program.

20. The program product of claim 19, wherein the signal bearing medium includes at least one of a transmission-type medium and a recordable medium.

21. A method of handling a translation lookaside buffer (TLB) miss for a TLB used in translating addresses from a first address space to a second address space, the method comprising:

(a) detecting a TLB miss responsive to an attempt to translate an address requested by a first software process among a plurality of software processes; and (b) accessing a first process-local address translation data structure among a plurality of process-local address translation data structures that is associated with the first software process to determine whether an address translation information for the requested address is stored in the first process-local address translation data structure.

* * * * *